United States Patent
Kim et al.

(10) Patent No.: US 8,947,998 B2
(45) Date of Patent: Feb. 3, 2015

(54) METHOD AND APPARATUS FOR DETECTING RADIO SIGNAL

(71) Applicants: LG Electronics Inc., Seoul (KR); Postech Academy-Industry Foundation, Pohang-si Gyeongbuk (KR)

(72) Inventors: Ki Jun Kim, Anyang-si (KR); Joon Ho Cho, Pohang-si (KR); Byung Wook Han, Pohang-si (KR)

(73) Assignees: LG Electronics Inc., Seoul (KR); Postech Academy-Industry Foundation, Pohang-si (KR)

(*) Notice: Subject to any disclaimer, the term of this patent is extended or adjusted under 35 U.S.C. 154(b) by 95 days.

(21) Appl. No.: 13/718,810

(22) Filed: Dec. 18, 2012

(65) Prior Publication Data

US 2013/0155831 A1 Jun. 20, 2013

Related U.S. Application Data

(60) Provisional application No. 61/578,189, filed on Dec. 20, 2011.

(51) Int. Cl.
| | |
|---|---|
| H04J 11/00 | (2006.01) |
| H04W 72/04 | (2009.01) |
| H04L 5/00 | (2006.01) |
| H04L 25/03 | (2006.01) |
| H04L 27/26 | (2006.01) |

(52) U.S. Cl.
CPC ............ *H04W 72/04* (2013.01); *H04L 5/0044* (2013.01); *H04L 25/03828* (2013.01); *H04L 27/2634* (2013.01); *H04W 72/0453* (2013.01)
USPC ............ 370/210; 370/332; 370/344; 370/437

(58) Field of Classification Search
USPC .......................... 370/206, 319, 332, 344, 437
See application file for complete search history.

(56) References Cited

U.S. PATENT DOCUMENTS

| | | | | |
|---|---|---|---|---|
| 5,489,879 | A  * | 2/1996 | English ........................ | 332/103 |
| 7,773,946 | B2 * | 8/2010 | Lee et al. ........................ | 455/45 |
| 8,064,503 | B2 * | 11/2011 | Yuda et al. .................... | 375/221 |
| 8,396,165 | B2 * | 3/2013 | Imamura et al. .............. | 375/316 |
| 8,542,758 | B2 * | 9/2013 | Harada et al. ................. | 375/260 |
| 8,670,493 | B2 * | 3/2014 | Karabinis ..................... | 375/259 |
| 2011/0164532 | A1 * | 7/2011 | Kawamura et al. .......... | 370/254 |

* cited by examiner

*Primary Examiner* — Ricky Ngo
*Assistant Examiner* — Dewanda Samuel
(74) *Attorney, Agent, or Firm* — McKenna Long & Aldridge LLP

(57) ABSTRACT

In an aspect, a method for transmitting data in a wireless communication system is provided. A wireless device determines a subcarrier and a subcarrier group to which a data sequence is allocated. The wireless device modulates the data sequence by a transmit filter to generate a data stream. A waveform of the transmit filter is determined based on the subcarrier and the subcarrier group. The wireless device generates a transmission signal based on the data stream. The wireless device transmits the transmission signal through the subcarrier. The transmission signal is cyclostationary.

6 Claims, 12 Drawing Sheets

METHOD AND APPARATUS FOR DETECTING RADIO SIGNAL

CROSS-REFERENCE TO RELATED APPLICATIONS

This application claims the benefit of priority of U.S. Provisional application 61/578,189 filed on Dec. 20, 2011, all of which are incorporated by reference in their entirety herein.

BACKGROUND OF THE INVENTION

1. Field of the invention

The present invention relates to wireless communication and, more particularly, to a method and apparatus for generating a transmission signal having a cycle period and spectral correlation in a multiple access system.

2. Related Art

Service requiring ultrahigh speed wireless communication, such as wireless Internet, is recently increasing rapidly. Thus, there have been carried out active researches into a communication scheme capable of guaranteeing ultrahigh speed wireless communication.

In particular, there have been carried out active researches into methods of a plurality of users efficiently using limited frequency resources, such as Time Division Multiple Access (TDMA), Frequency Division Multiple Access (FDMA), and Code Division Multiple Access (CDMA).

Orthogonal Frequency Division Multiple Access (OFDMA) is also a method of a plurality of users being capable of efficiently using limited radio resources. In an OFDMA system, subcarriers are allocated to users and a transmission signal is generated using Fourier Transform (FT). An OFDMA system has been in the spotlight as the core technology of a Wireless Local Area Network (WLAN), such as Wi-Fi, and a cellular network, such as LTE, in that it has low complexity and it can minimize interference between users simply.

In addition, there have been researches into a signal design using a new method for supporting multiple access, such as Single Carrier-Frequency Division Multiple Access (SC-FDMA).

Meanwhile, in conventional multi-carrier systems, such as FDMA and OFDMA, subcarriers are allocated to users without being overlapped with each other. Accordingly, there is no correlation between the subcarriers and also there is no cycle period in the subcarriers. In accordance with a recent research, it has been demonstrated that frequency efficiency can be maximized by generating a signal having a specific cycle period and spectral correlation. For this, a research is carried out to generate a signal for achieving the channel capacity of a system in which a frequency band is shared and a channel including cyclostationary interference. In order to implement the research, it is essential to design a signal having the degree of freedom from a viewpoint of a cycle period and spectral correlation.

SUMMARY OF THE INVENTION

An object of the present invention is to provide a method and apparatus for generating a transmission signal having a cycle period and spectral correlation in a multiple access system.

Another object of the present invention is to provide a method and apparatus for maintaining the structure of a transceiver in conventional Frequency Division Multiple Access (FDMA) and Orthogonal Frequency Division Multiple Access (OFDMA) systems while achieving the above object.

In an aspect, a method for transmitting data in a wireless communication system is provided. A wireless device determines a subcarrier and a subcarrier group to which a data sequence is allocated. The wireless device modulates the data sequence by a transmit filter to generate a data stream. A waveform of the transmit filter is determined based on the subcarrier and the subcarrier group. The wireless device generates a transmission signal based on the data stream. The wireless device transmits the transmission signal through the subcarrier. The transmission signal is cyclostationary.

In another aspect, a wireless device in a wireless communication system is provided. The wireless device includes a radio frequency (RF) unit for receiving a radio signal and a processor operatively coupled with the radio frequency unit. The processor is configured to determine a subcarrier and a subcarrier group to which a data sequence is allocated, modulate the data sequence by a transmit filter to generate a data stream, generate a transmission signal based on the data stream; and transmit the transmission signal through the subcarrier. A waveform of the transmit filter is determined based on the subcarrier and the subcarrier group. The transmission signal is cyclostationary.

DESCRIPTION OF EXEMPLARY EMBODIMENTS

The following technologies can be used in a variety of wireless communication systems, such as a Wireless Local Area Network (WLAN) and a cellular network. For example, the following technologies can be used in Frequency Division Multiple Access (FDMA) and Orthogonal Frequency Division Multiple Access (OFDMA). OFDMA can be implemented using radio technologies, such as Institute of Electrical and Electronics Engineers (IEEE) 802.11 Wi-Fi, IEEE 802.16 WiMAX, IEEE 802-20, or Evolved UTRA (E-UTRA). IEEE 802.16m is the evolution of IEEE 802.16e, and provides backward compatibility with a system based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) that uses Evolved-UMTS Terrestrial Radio Access (E-UTRA). 3GPP LTE adopts OFDMA in downlink and adopts SC-FDMA in uplink. LTE-Advanced (LTE-A) is the evolution of 3GPP LTE.

In order to classify a description, a radio cellular network system is chiefly described, but the technical spirit of the present invention is not limited thereto.

Hereinafter, embodiments of the present invention are described in detail with reference to the accompanying drawings.

Figure 1:
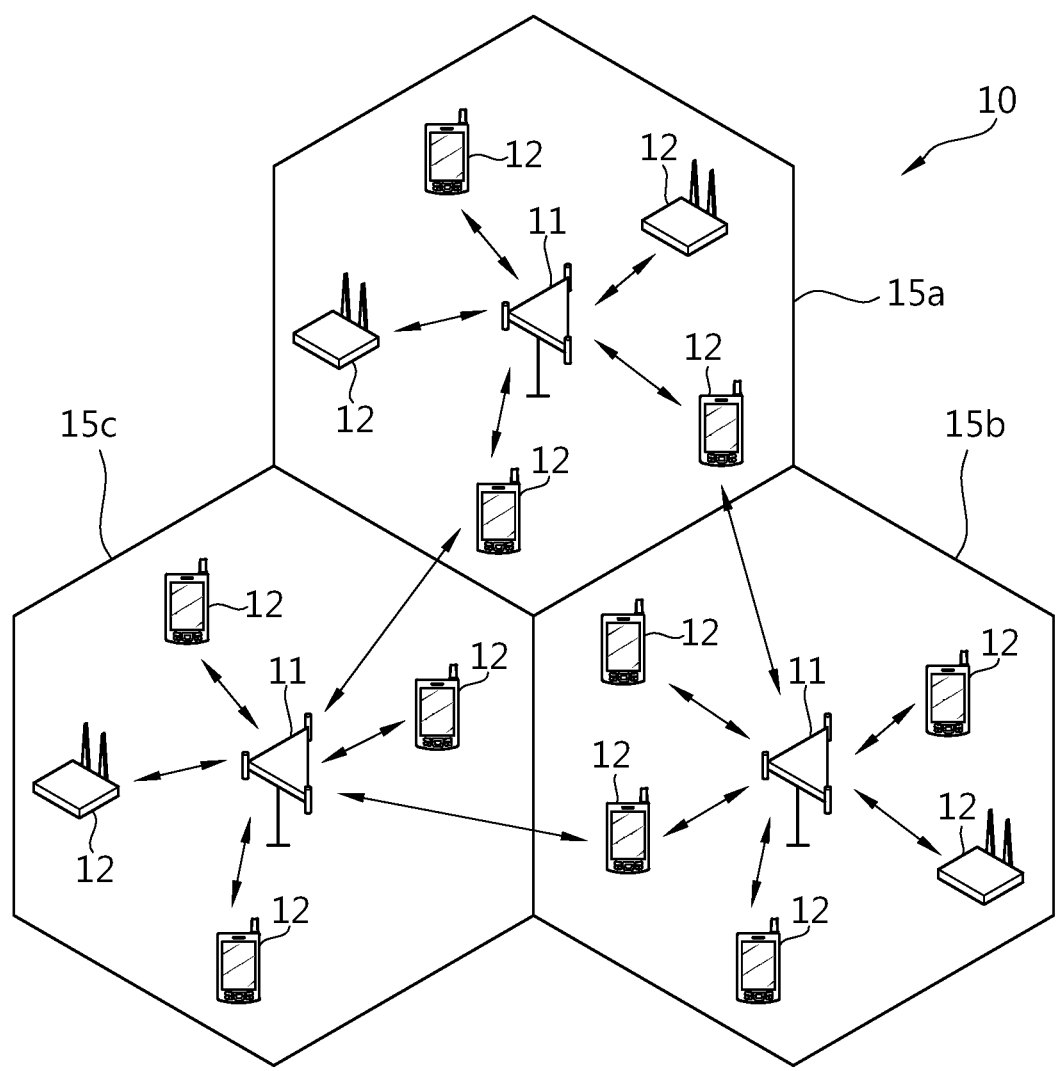
FIG. 1 shows a wireless cellular network system.

FIG. 1 shows a wireless cellular network system.

The wireless cellular network system 10 includes at least one Base Station (BS) 11. The BSs 11 provide communication services to respective geographical areas (commonly called cells) 15a, 15b, and 15c. The cell can be classified into a plurality of regions (called sectors). User Equipment (UE) 12 can be fixed or mobile. The UE 12 can be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device. The BS 11 commonly refers to a fixed station that communicates with the UE 12. The BS 11 can be called another terminology, such as an evolved-NodeB (eNB), a Base Transceiver System (BTS), or an Access Point (AP).

UE commonly belongs to one cell. A cell to which the UE belongs is called a serving cell. A BS that provides communication service to the serving cell is called a serving BS. In a cellular system, another cell neighboring a serving cell is present. Another cell neighboring a serving cell is called a neighbor cell. A BS that provides communication service to the neighbor cell is called a neighbor BS. A serving cell and a neighbor cell are relatively determined on the basis of UE.

In general, downlink means communication from the BS 11 to the UE 12, and uplink means communication from the UE 12 to the BS 11. In downlink, a transmitter can be part of the BS 11 and a receiver can be part of the UE 12. In uplink, a transmitter can be part of the UE 12 and a receiver can be part of the BS 11.

A wireless communication system can be any one of a Multiple-Input Multiple-Output (MIMO) system, a Multiple-Input Single-Output (MISO) system, a Single-Input Single-Output (SISO) system, and a Single-Input Multiple-Output (SIMO) system. An MIMO system uses a plurality of transmit antennas and a plurality of receive antennas. An MISO system uses a plurality of transmit antennas and one receive antenna. An SISO system uses one transmit antenna and one receive antenna. An SIMO system uses one transmit antenna and a plurality of receive antennas. Hereinafter, a transmit antenna means a physical or logical antenna used to transmit one signal or stream, and a receive antenna means a physical or logical antenna used to receive one signal or stream.

Figure 2:
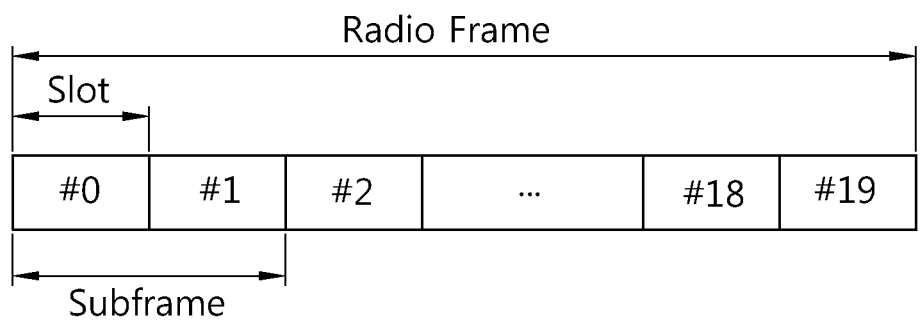
FIG. 2 shows the structure of a radio frame in 3GPP LTE, that is, an example of a wireless cellular network system.

FIG. 2 shows the structure of a radio frame in 3GPP LTE, that is, an example of a wireless cellular network system.

For the structure of the radio frame, reference can be made to Paragraph No. 5 of 3rd Generation Partnership Project (3GPP) TS 36.211 V10.3.0 (2011-09) "Technical Specification Group Radio Access Network; Evolved Universal Terrestrial Radio Access (E-UTRA); Physical channels and modulation (Release 10)". Referring to FIG. 2, the radio frame includes 10 subframes, and one subframe includes 2 slots. Slots within the radio frame are assigned slot numbers #0 to #19. The time taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms.

One slot includes a plurality of Orthogonal Frequency Division Multiplexing (OFDM) symbols in the time domain and includes a plurality of subcarriers in the frequency domain. An OFDM symbol is for representing one symbol period because 3GPP LTE uses OFDMA in downlink. An OFDM symbol can be called another terminology depending on a multiple-access scheme. A Resource Block (RB) is a resource allocation unit, and an RB includes a plurality of continuous subcarriers in one slot. The structure of the radio frame is only illustrative. Accordingly, the number of subframes included in a radio frame, the number of slots included in a subframe, or the number of OFDM symbols included in a slot can be changed in various manners.

In 3GPP LTE, one slot is defined to include 7 OFDM symbols in a Normal Cyclic Prefix (CP) and one slot is defined to include 6 OFDM symbols in an extended CP.

Figure 3:
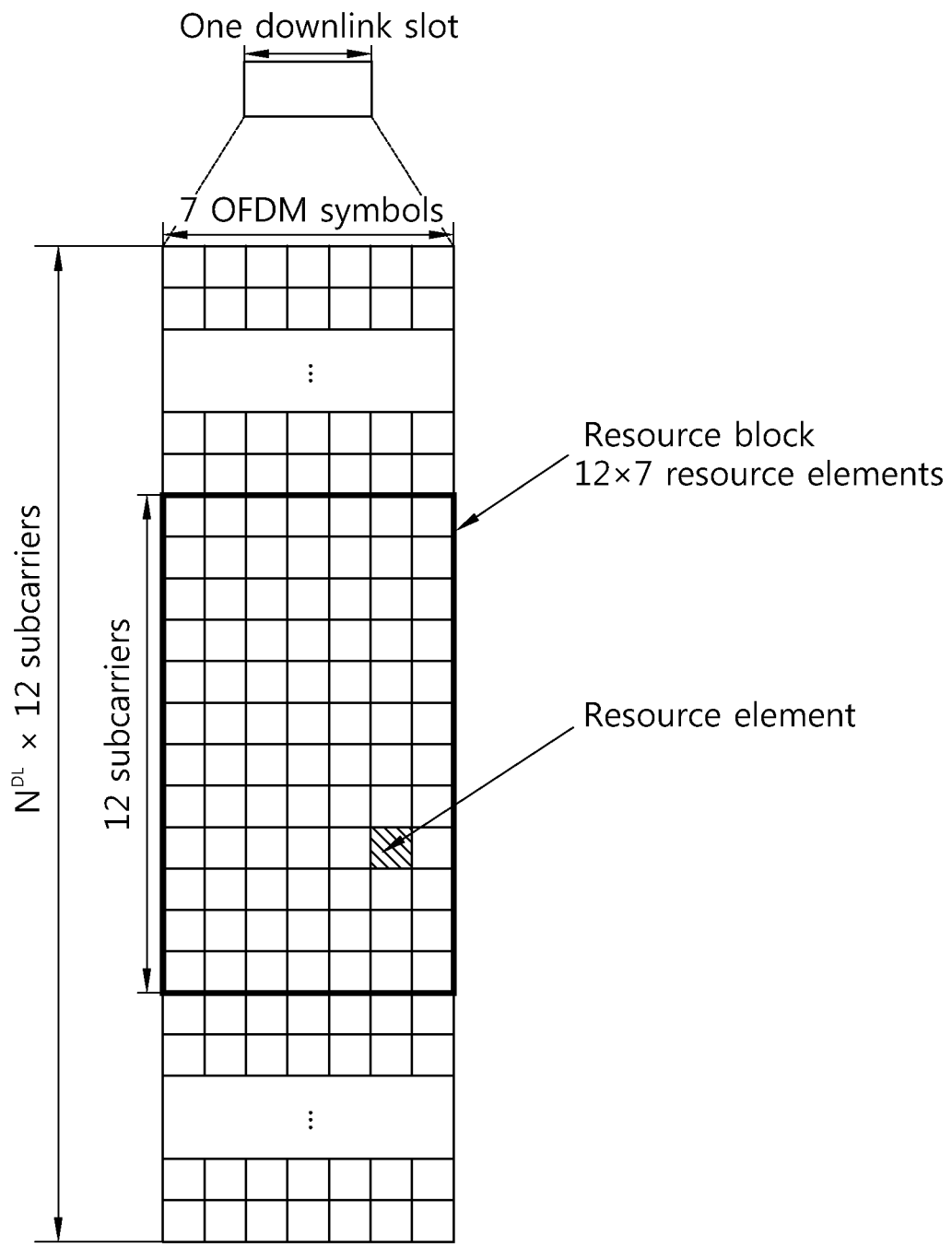
FIG. 3 shows an example of a resource grid for one downlink slot.

FIG. 3 shows an example of a resource grid for one downlink slot.

A downlink slot includes a plurality of OFDM symbols in the time domain and includes $N_{RB}$ RBs in the frequency domain. The number of RBs $N_{RB}$ included in a downlink slot depends on a downlink transmission bandwidth configured in a cell. For example, in an LTE system, $N_{RB}$ can be any one of 6 to 110. One RB includes a plurality of subcarriers in the frequency domain. Furthermore, an uplink slot can have the same structure as the downlink slot.

Each of elements on the resource grid is called a Resource Element (RE). The REs on the resource grid can be identified by an index pair (k,l) within a slot. Here, k (k=0, . . . , NRBx12-1) is a subcarrier index in the frequency domain, and l (l=0, . . . , 6) is an OFDM symbol index in the time domain.

Referring to FIG. 3, one RB includes 7×12 REs consisting of 7 OFDM symbols in the time domain and 12 subcarriers in the frequency domain. The number of OFDM symbols and the number of subcarriers can be changed in various manners depending on the length of a CP, frequency spacing, etc. For example, the number of OFDM symbols can be 7 in the case of a normal CP, and the number of OFDM symbols can be 6 in the case of an extended CP. In one OFDM symbol, one of 128, 256, 512, 1024, 1536, and 2048 can be selected and used as the number of subcarriers.

Meanwhile, in current communication systems, such as 802.11 Wi-Fi, IEEE 802.16 WiMAX, 3GPP LTE, and LTE-A, OFDMA is used because it has low complexity and can minimize interference between users conveniently. In an OFDMA system, subcarriers are allocated to users and a transmission signal is generated using Fourier Transform (FT). In OFDMA, subcarriers are allocated to users without being overlapped with each other. Accordingly, there is no correlation between the subcarriers and, in general, there is no cycle period in the subcarriers. In accordance with a recent research, it has been demonstrated that frequency efficiency can be maximized by generating a signal having a specific cycle period and spectral correlation. A method and apparatus for generating a transmission signal having a cycle period and spectral correlation is needed.

Figure 4:
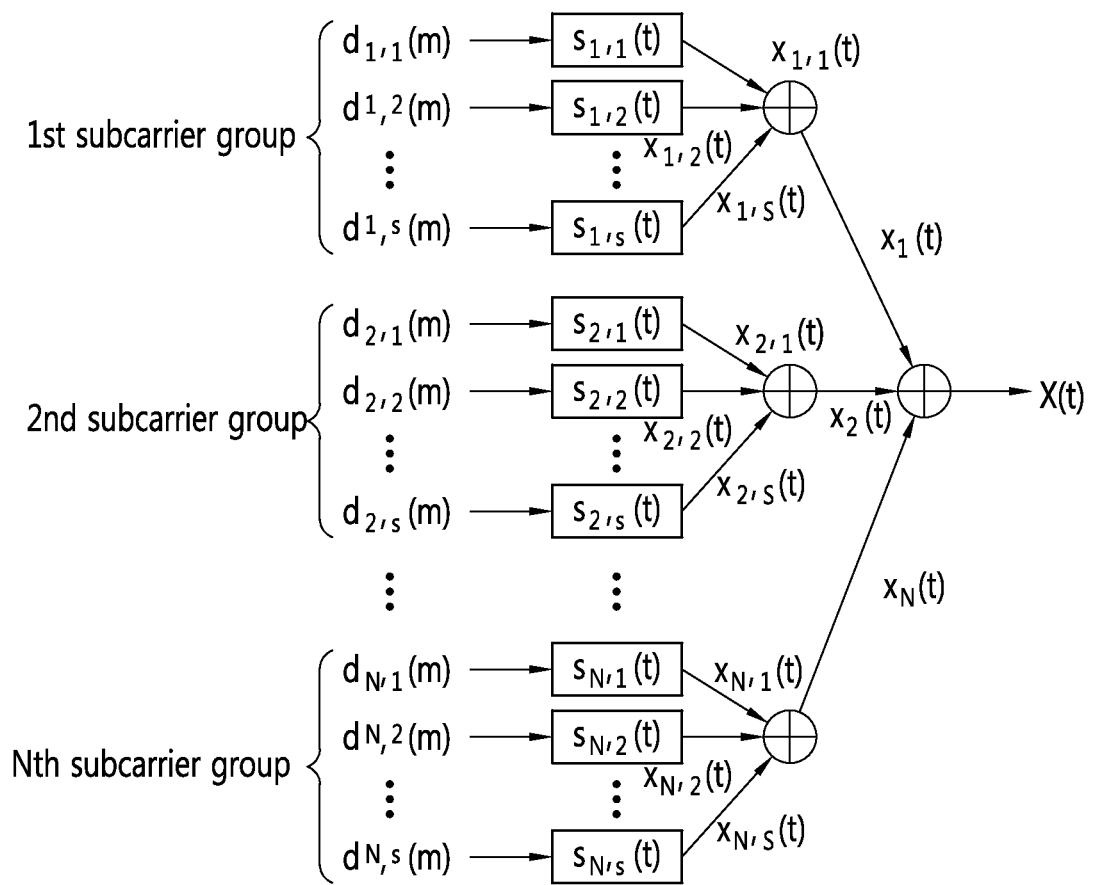
FIG. 4 shows that a transmission signal $X(t)$ is generated from N subcarrier group signals $X_n(t)$.

FIG. 4 shows that a transmission signal X(t) is generated from N subcarrier group signals $X_n(t)$.

Referring to FIG. 4, the transmission signal X(t) is specified by the sum of the N subcarrier group signals $X_n(t)$ as in Equation 1 below.

$$X(t) = \sum_{n=1}^{N} X_n(t) \quad \langle \text{Equation 1} \rangle$$

Furthermore, an $n^{th}$ subcarrier group signal $X_n(t)$ is specified by the sum of S multiple data streams $X_{n,s}(t)$ within an $n^{th}$ subcarrier group as in Equation 2 below.

$$X_n(t) = \sum_{s=1}^{S} X_{n,s}(t) \quad \langle \text{Equation 2} \rangle$$

In Equation 2, in general, the number of data streams S is defined as a natural number not greater than L that is defined based on a system bandwidth B and the cycle period T of a signal to be generated, as in Equation 3 below.

$$S \leq L = \lceil 2BT \rceil \quad \langle \text{Equation 3} \rangle$$

In Equation 3, $\lceil \ \rceil$ is a ceilling function, and $\lceil c \rceil$ is the smallest integer not less than c.

An $s^{th}$ data stream $X_{n,s}(t)$ mapped to the $n^{th}$ subcarrier group is generated by convoluting a data sequence $d_{n,s}[m]$ and the waveform of a transmit filter $s_{n,s}(t)$ as in Equation 4. That is, the data sequence $d_{n,s}[m]$ is generated into a linear modulation signal $X_{n,s}(t)$ by way of the waveform of the transmit filter $s_{n,s}(t)$.

$$X_{n,s}(t) = \sum_{m=-\infty}^{\infty} d_{n,s}[m] s_{n,s}(t - mT) \quad \langle \text{Equation 4} \rangle$$

The waveform of the transmit filter $s_{n,s}(t)$ for the $s^{th}$ data stream $d_{n,s}[m]$ allocated to the $n^{th}$ subcarrier group can be differently designed depending on an FDMA-based method and an OFDMA-based method.

First, in the FDMA-based method not using Fast Fourier Transform (FFT), the waveform of the transmit filter $s_{n,s}(t)$ can be defined as in Equation 5-1 below.

$$s_{n,s}(t) = \sum_{l=1}^{L} \tilde{g}(t) \left( \alpha_{n,s,l} e^{j2\pi(f_l + \frac{n-1}{2NT})t} + \alpha_{n,s,l+L} e^{-j2\pi(f_l + \frac{n-1}{2NT})t} \right) \quad \langle \text{Equation 5-1} \rangle$$

In Equation 5-1, $\tilde{g}(t)$ is a function having a value of 1 in a frequency domain $$\left[ 0, \frac{1}{2NT} \right)$$

section and having a value of 0 elsewhere. That is, the Fourier transform function $\tilde{G}(f)$ of $\tilde{g}(t)$ can be defined as in Equation 5-2 below.

$$\tilde{G}(f) \triangleq \mathcal{F}\{\tilde{g}(t)\} = \begin{cases} 1, & \forall f \in \left[ 0, \frac{1}{2NT} \right) \\ 0, & \text{elsewhere.} \end{cases} \quad \langle \text{Equation 5-2} \rangle$$

Furthermore, in <Equation 5-1>, $f_l$ is a parameter defined as in Equation 5-3 below.

$$f_l \triangleq \frac{l - \lfloor L/2 \rfloor - 1}{T} \quad \langle \text{Equation 5-3} \rangle$$

In Equation 5-3, $\lfloor \ \rfloor$ is a floor function, and $\lceil c \rceil$ is the largest integer not greater than c.

Furthermore, in Equation 5-1, $\alpha_{n,s,l}$ are complex-valued weighting factors that determine the power and phase of each subcarrier. The definition of other parameters is the same as that of the above-described equations. That is, L is a natural number determined based on a bandwidth of the wireless communication system and a cycle period of the transmission signal, N is a number of subcarrier groups, and T is a cycle period.

Figure 5:
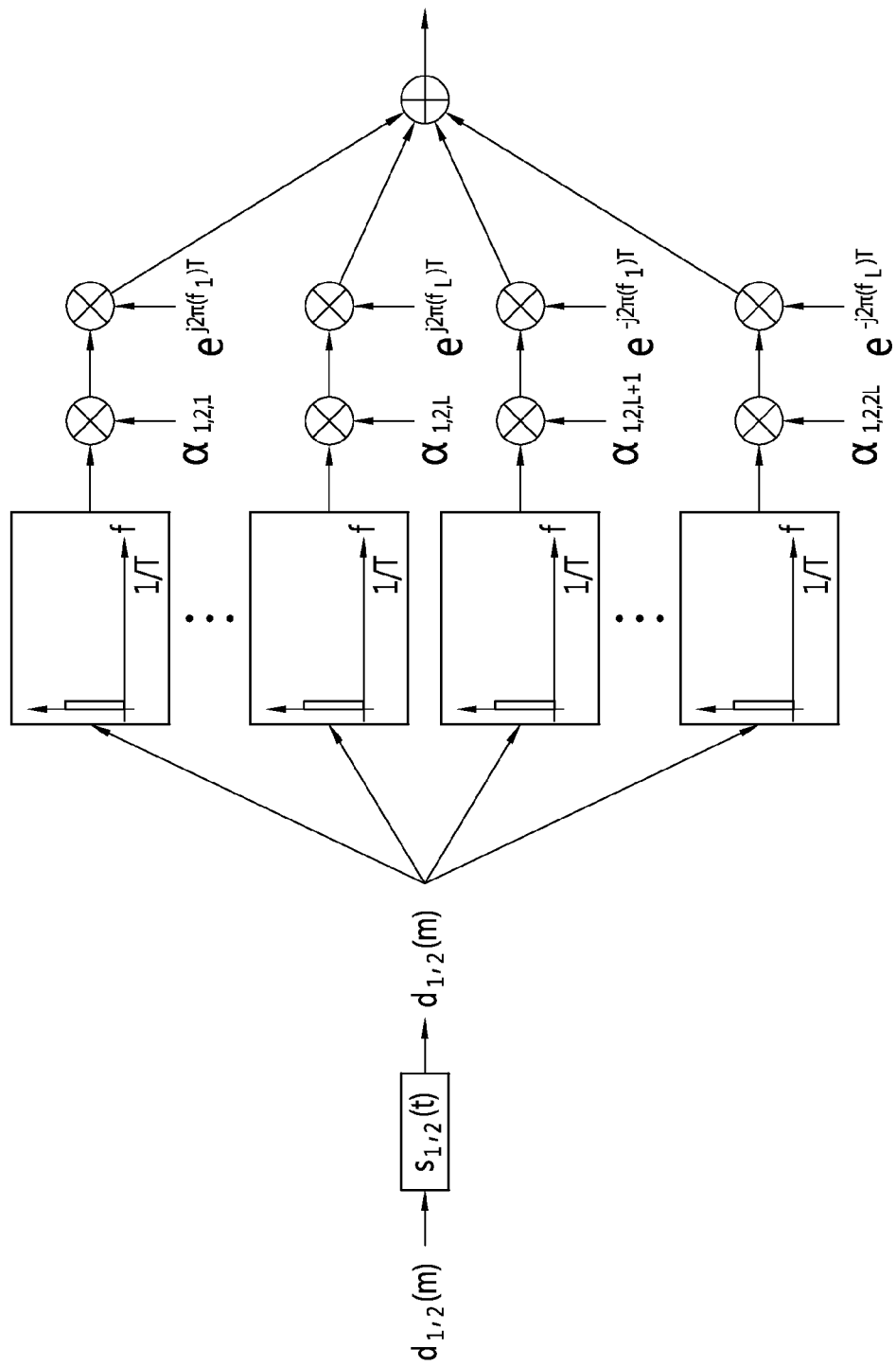
FIG. 5 shows an example in which a second data stream mapped to a first subcarrier group is designed in generating a transmission signal in accordance with an FDMA-based method.
Figure 6:
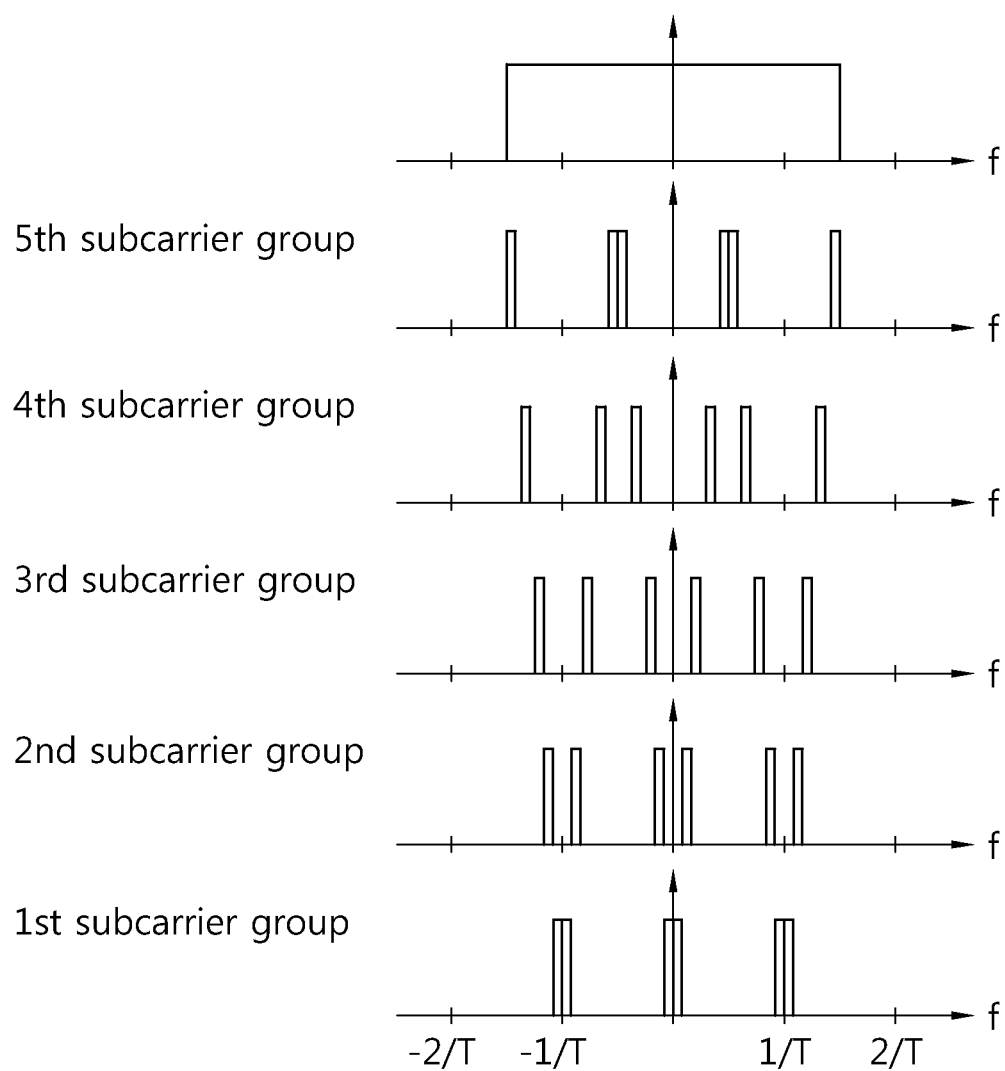
FIG. 6 shows an example of the pulse waveform of a signal for subcarrier groups (when N=5) in generating a transmission signal in accordance with an FDMA-based method.

FIG. 5 shows an example in which a second data stream mapped to a first subcarrier group is designed in generating a transmission signal in accordance with an FDMA-based method. FIG. 6 shows an example of the pulse waveform of a signal for subcarrier groups (when N=5) in generating a transmission signal in accordance with an FDMA-based method.

Referring to FIG. 6, signals for respective subcarrier groups are generated in the form of combinations of narrow band waveforms that are symmetrical to f=-1/T, 0, 1/T. Furthermore, pulse waveforms for the subcarrier group signals do not overlap with each other. Accordingly, the pulse waveforms of the subcarrier group signals do not interfere with each other. As a result, a transmission signal generated by an FDMA-based method is cyclostationary so that it has a cycle period T, and the dimension of the transmission signal is determined depending on the number of data streams used in each subcarrier group.

Next, in an OFDMA-based method using Fast Fourier Transform (FFT), the waveform of a transmit filter $s_{n,s}(t)$ can be defined as in Equation 6 below.

$$s_{n,s}(t) = \sum_{l=1}^{L} \sum_{k=1}^{2NL} \left[ \frac{\alpha_{n,s,l}}{\sqrt{2NL}} e^{j2\pi(2(l-1)N+n)k/(2NL)} + \frac{\alpha_{n,s,l+L}}{\sqrt{2NL}} e^{j2\pi(2lN-n+1)k/(2NL)} \right] p(t - kT_c) \quad \langle \text{Equation 6} \rangle$$

In <Equation 6>, p(t) is a sinc pulse having duration $T_C$=T/(2NL). A waveform having an excess bandwidth of 0 or greater may be used instead of the sinc pluse, if necessary. The definition of other parameters is the same as that of the above-described equations.

Figure 7:
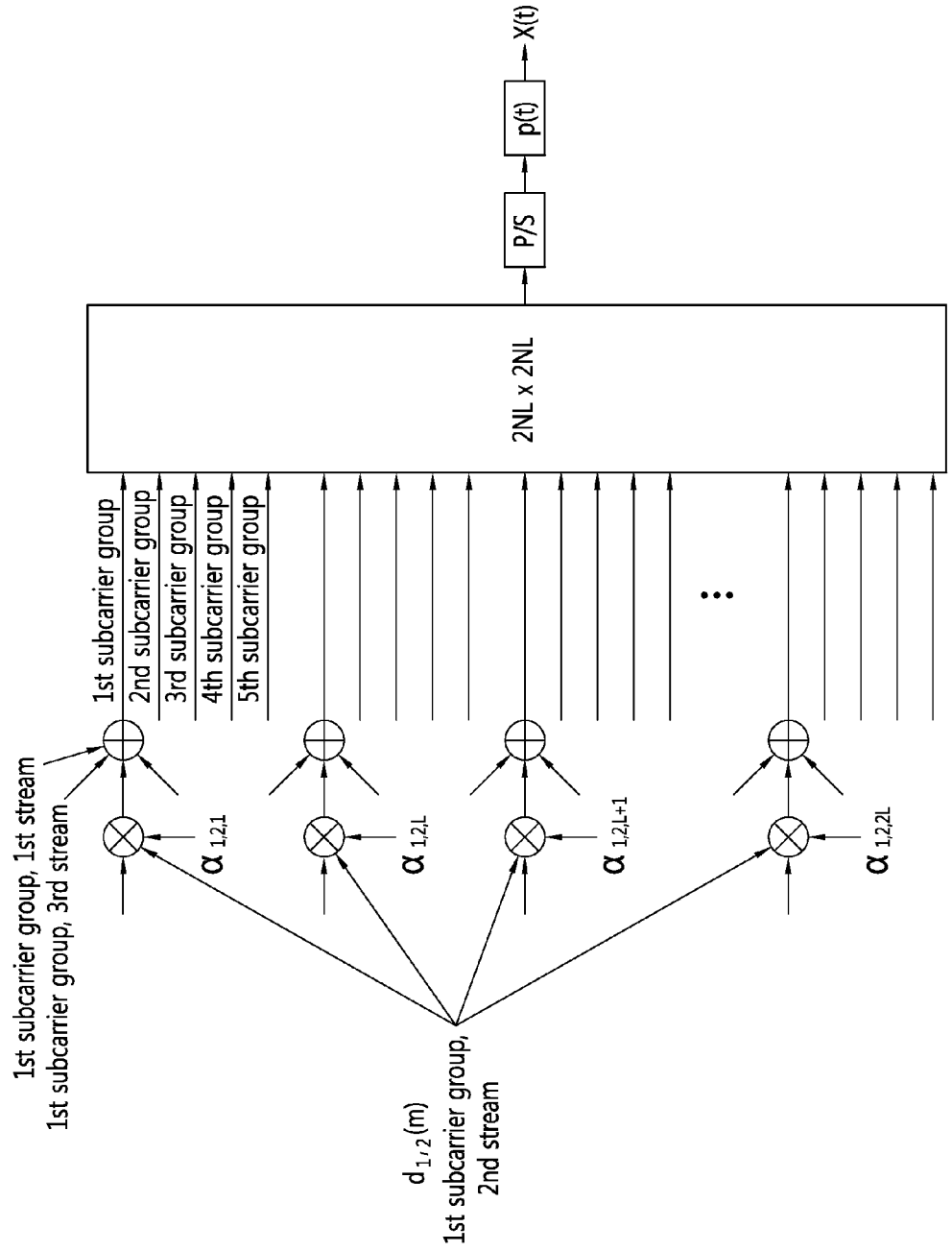
FIG. 7 shows an example in which a second data stream mapped to a first subcarrier group in generating a transmission signal in accordance with an OFDMA-based method.

FIG. 7 shows an example in which a second data stream mapped to a first subcarrier group in generating a transmission signal in accordance with an OFDMA-based method. The OFDMA-based the transmission signal according to Equation 6 can be implemented by FFT as in FIG. 7.

A data sequence $d_{n,s}[m]$ is multiplied by the weighting factor $\alpha_{n,s,l}$ for each allocated subcarrier. Here, a subcarrier group allocated to the data sequence $d_{n,s}[m]$ and a subcarrier can have a relation, such as that of Equation 7. That is, each subcarrier group can be determined based on a subcarrier to which the data sequence is allocated.

$1^{st}$ subcarrier group={1,2N, 2N+1,4N,4N+1,...,
    2N(L−1)+1,2NL}$^{th}$ subcarrier $2^{nd}$ subcarrier group={2,2N−1,2N+2,4N−1,4N+2,...,
    2N(L−1)+2,2NL−1}$^{th}$ subcarrier $n^{th}$ subcarrier group={n,2N−(n−1),2N+n,4N−(n−1),..
    ., 2N(L−1)+n,2NL−(n−1)}$^{th}$ subcarrier  <Equation 7>

Since one subcarrier group is inputted to a Fast Fourier transform (FFT) unit of a 2L-point, FFT of a 2NL×2NL size is performed on a total of N subcarrier groups.

Figure 8:
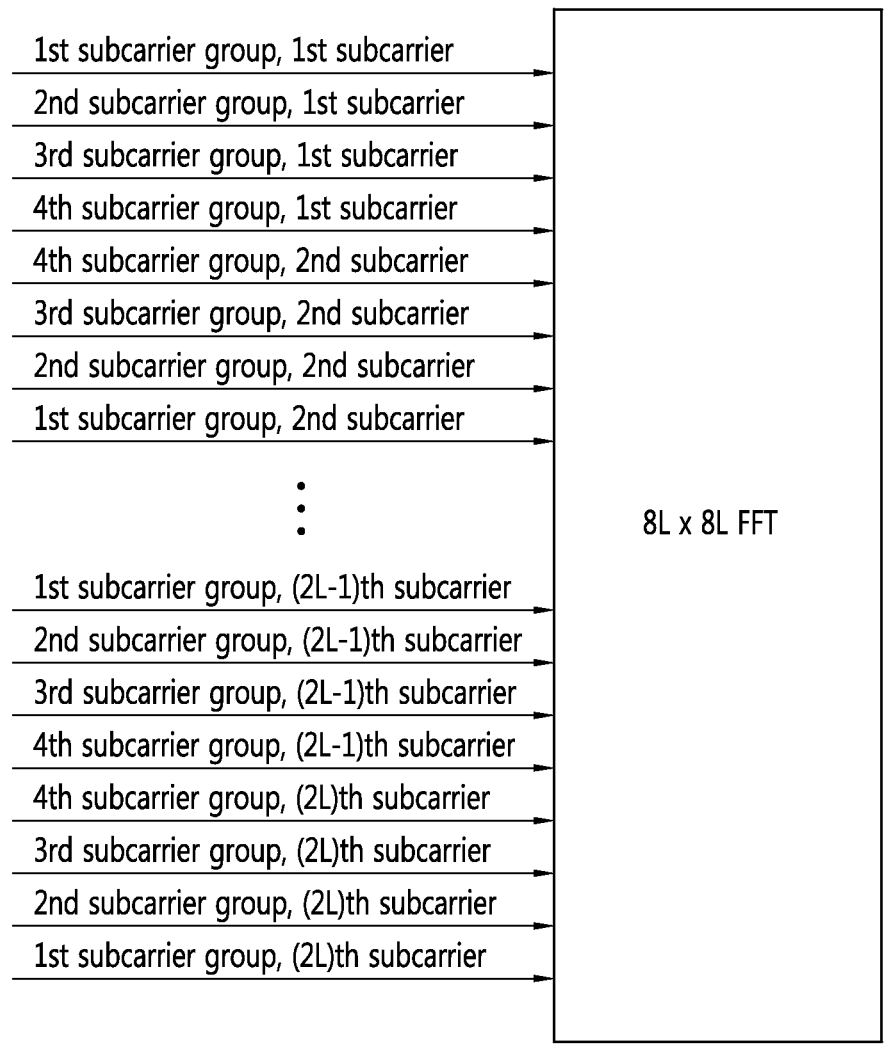
FIG. 8 shows an example of subcarriers inputted to the FFT unit in generating a transmission signal in accordance with an OFDMA-based method (when N=4).

A data block on which the FFT has been performed is serialized by a parallel-to-series (P/S) conversion unit, modulated by a transmit waveform p(t), and transmitted. FIG. 8 shows an example of subcarriers inputted to the FFT unit in generating a transmission signal in accordance with an OFDMA-based method (when N=4).

Meanwhile, if a proper-complex transmission signal is necessary, an L-point FFT from which the FFT input of the remaining (L+1) to 2L-point has been removed with the FFT input of 1 to L-point left is sufficient.

If the number of subcarriers N is very many, a transmission signal X(t) generated by the OFDMA-based method is cyclostationary so that it approximately has a cycle period T. Furthermore, like in the FDMA-based method, the dimension of the transmission signal is determined by the number of data streams used in each subcarrier group.

Figure 9:
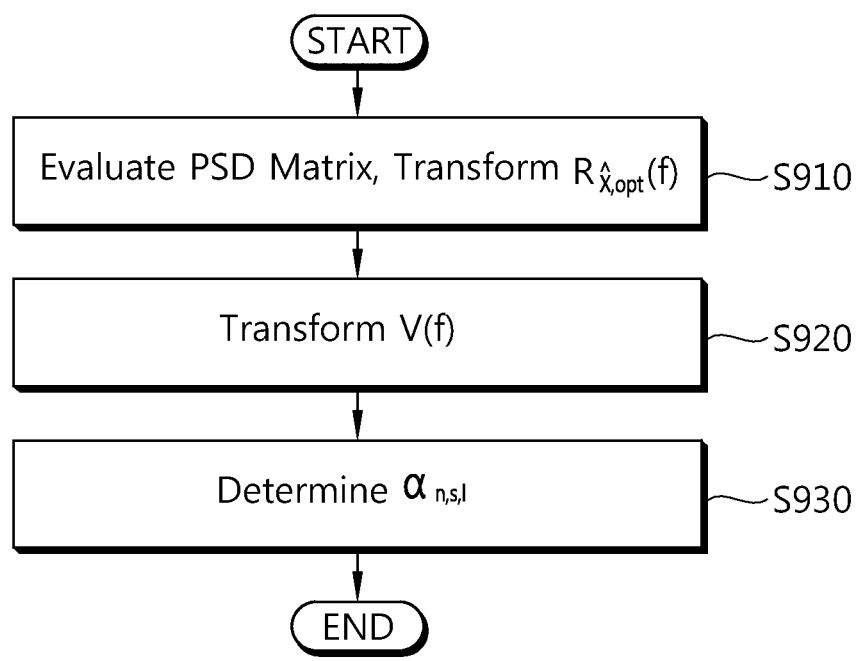
FIG. 9 shows an example of a method of determining the weighting factor $\alpha_{n,s,l}$ in the waveform of the transmit filter $s_{n,s}(t)$.
Figure 10:
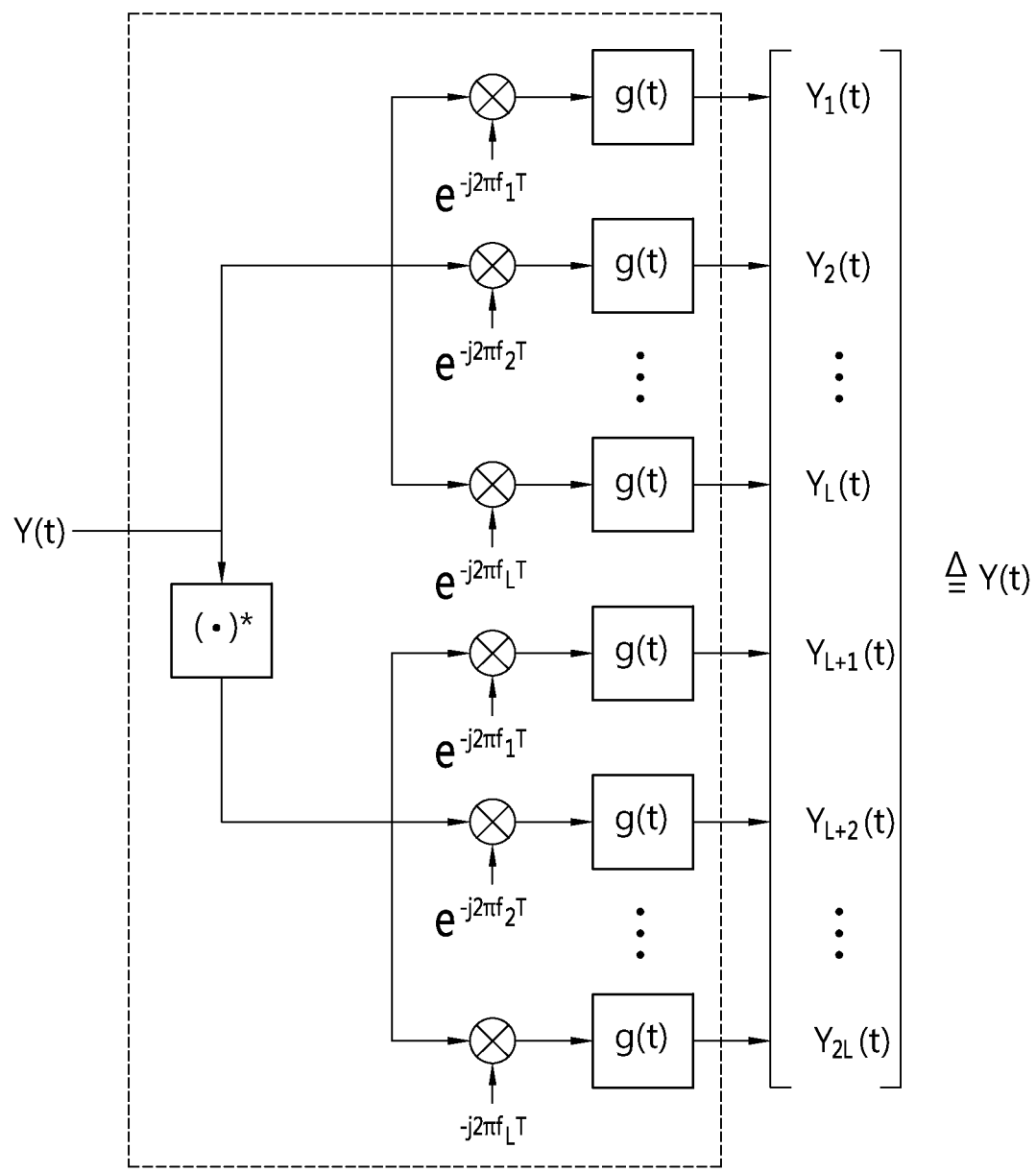
FIG. 10 shows an example of a properizing FREquency SHift (p-FRESH).

FIG. 9 shows an example of a method of determining the weighting factor $\alpha_{n,s,l}$ in the waveform of the transmit filter $s_{n,s}(t)$. FIG. 10 shows an example of a properizing FREquency SHift (p-FRESH).

As described above, the weighting factor $\alpha_{n,s,l}$ in the waveform of the transmit filter $s_{n,s}(t)$ is determined for each subcarrier. In generating a transmission signal in accordance with an OFDMA-based method, an optimal method of determining the weighting factor $\alpha_{n,s,l}$ is as follows. It is hereinafter assumed that [1] a transmission signal to generated is inputted to a properizing FREquency SHift (p-FRESH) determined by the bandwidth B and cycle period T of the signal, [2] a continuous-time vector having a length of 2L is generated as the output of the p-FRESH, and [3] Fourier transform of an autocorrelation matrix for the vector, that is, a Power Spectrum Density (PSD) matrix $R_{\tilde{X},opt}(f)$, is subject to eigenvalue decomposition into V(f), that is, a unitary matrix (all columns are orthonormal), and $R_{\tilde{X},opt}(f)$, that is, a diagonal matrix as in Equation 8 below.

$$R_{X,opt}(f) = V(f) R_{\tilde{X},opt}(f) V(f)^{\mathcal{H}} \quad \text{<Equation 8>}$$

Referring back to FIG. 9, in the center frequency $$f^{(n)} = \frac{2(n-1)+1}{4NT}$$

of the $n^{th}$ subcarrier group, the PSD matrix is evaluated, and $R_{\tilde{X},opt}(f)$ is transformed into a unit matrix as in Equation 9 below at step S910.

$$R_X(f^{(n)}) = V(f^{(n)}) R_{\tilde{X},opt}(f^{(n)}) V(f^{(n)})^{\mathcal{H}} \quad \text{<Equation 9>}$$
$$= \tilde{V}(f^{(n)}) I_{N_p(f^{(n)})} \tilde{V}(f^{(n)})^{\mathcal{H}}$$

V(f) is transformed as in Equation 10 below at step S920.

$$\tilde{V}(f) = \left[ [R_{\tilde{X},opt}(f)]_{1,1}^{\frac{1}{2}} v_1(f) [R_{\tilde{X},opt}(f)]_{2,2}^{\frac{1}{2}} \right. \quad \text{<Equation 10>}$$
$$\left. v_2(f) \ldots [R_{\tilde{X},opt}(f)]_{N_p(f),N_p(f)}^{\frac{1}{2}} v_{N_p(f)}(f) \right]$$

In Equation 10, $[R_{\tilde{X},opt}(f)]_{n,m}$ means the (n,m) component of $R_{\tilde{X},opt}(f)$.

Meanwhile, it can be seen that $\tilde{V}(f)$ is no longer unirary, but the columns of are still orthogonal.

The weighting factor $\alpha_{n,s,l}$ is determined as in Equation 11 below at step S930. Here, the data sequence $d_{n,s}[m]$ can be selected as a random data sequence of a unit variance.

When the above method is generalized, if a PSD matrix for the p-FRESH output of a signal to be generated is given, an optimal weighting factor $\alpha_{n,s,l}$ can be determined by performing the eigenvalue decomposition and the steps S910 to S930 as in Equation 8. As a result, a transmission signal having a cycle period and spectral correlation can be generated.

Figure 11:
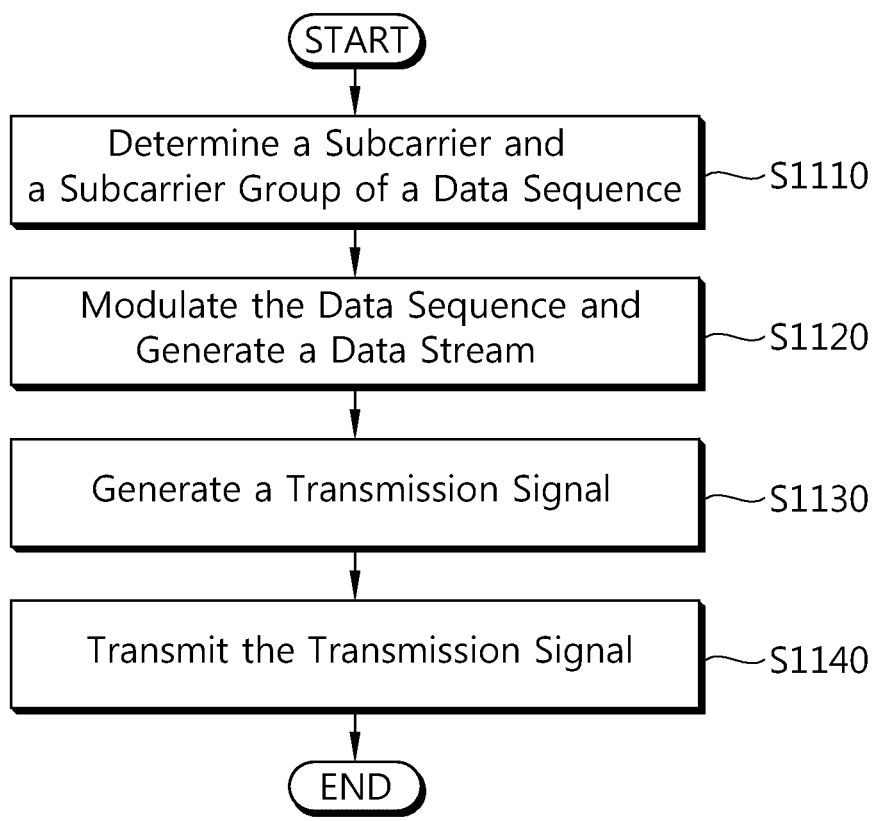
FIG. 11 shows a method of transmitting data by a wireless device in accordance with an embodiment of the present invention.

FIG. 11 shows a method of transmitting data by a wireless device in accordance with an embodiment of the present invention.

The wireless device determines a subcarrier and subcarrier group to which a data sequence to be transmitted will be allocated at step S1110. For example, the subcarrier group is determined based on the subcarrier by Equation 7.

The wireless device generates a data stream by modulating the data sequence by using the transmit filter at step S1120. As described above, the data stream can be generated by convoluting the data sequence and the waveform of the transmit filter as in Equation 4. The waveform of the transmit filter is determined based on the subcarrier and the subcarrier group determined at step S1110. As described above, the waveform of the transmit filter can be designed differently depending on an FDMA-based method and an OFDMA-based method. For example, in the FDMA-based method, the waveform of the transmit filter can be determined by Equation 5-1. For example, in the OFDMA-based method, the waveform of the transmit filter can be determined by Equation 6.

The wireless device generates a transmission signal based on the data stream at step S1130. For a process of generating the transmission signal from the data stream, reference can be made to Equations 1 and 2, FIGS. 4 to 5, and FIG. 7. The generated transmission signal is cyclostationary.

Finally, the wireless device transmits the transmission signal through the allocated subcarrier at step S1140.

Figure 12:
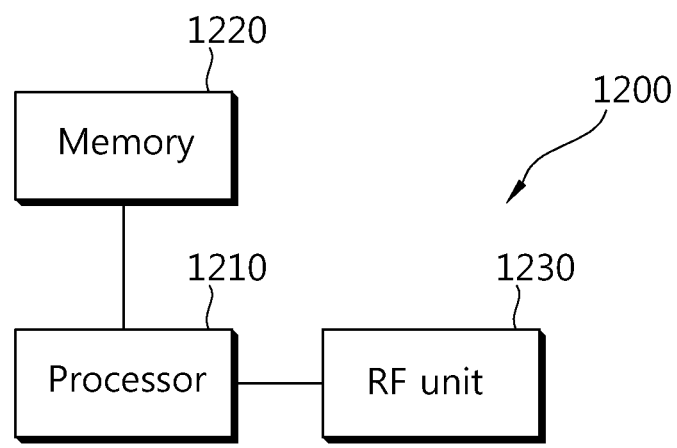
FIG. 12 is a block diagram showing the wireless communication system in which the embodiment of the present invention is implemented.

FIG. 12 is a block diagram showing the wireless communication system in which the embodiment of the present invention is implemented.

The wireless device 1200 includes a processor 1210, memory 1220 and radio frequency (RF) unit 1230. The memory 1220 is connected to the processor 1210, and stores various information for driving the processor 1210. The RF unit 1230 is connected to the processor 1210, and transmits and/or receives radio signal. The processor 1210 implements proposed functions, procedures and/or methods. In the embodiment of the present invention, the operation of the wireless device can be implemented by the processor 1210.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In accordance with the method and apparatus for transmitting data according to the present invention, the cyclostationarity, frequency correlation, and propriety of a transmission signal can be controlled in a desired form by a characteristic combination of subcarriers allocated to respective users, and a cyclostationary signal having a high dimension can be generated by using a multi-data stream. Furthermore, a transmission signal having a high degree of freedom can be generated in the form of the PSD of the transmission signal by allocating different transmit power to each subcarrier and data stream. Accordingly, frequency efficiency is increased.

As an example of a detailed effect, a water-filling scheme in the frequency domain in relation to a continuous signal model in a cyclostationary Gaussian noise channel and/or a theoretical signal design scheme for achieving a channel capacity by using Gaussian random codebook can be practically implemented using a linear modulation method. The design schemes are meaningful in that they propose a performance lower bound for an optimal transmission signal physically and a transmission signal generated as a result of the optimization has a cyclostationarity having the same cycle period as noise. Accordingly, the design schemes can be used as core technologies in lots of applications requiring improved frequency efficiency.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting data in a wireless communication system, the method comprising:
    determining, by a wireless device, a subcarrier and a subcarrier group to which a data sequence is allocated;
    modulating, by the wireless device, the data sequence by a transmit filter to generate a data stream, a waveform of the transmit filter determined based on the subcarrier and the subcarrier group;
    generating, by the wireless device, a transmission signal based on the data stream; and
    transmitting, by the wireless device, the transmission signal through the subcarrier,
    wherein the transmission signal is cyclostationary,
    wherein the data sequence is a sth data sequence allocated to a nth subcarrier group, and the waveform of the transmit filter $s_{n,s}(t)$ is determined by one of following equations, $$s_{n,s}(t) = \sum_{l=1}^{L} \tilde{g}(t)\left(\alpha_{n,s,l} e^{j2\pi(f_l + \frac{n-1}{2NT})t} + \alpha_{n,s,l+L} e^{-j2\pi(f_l + \frac{n-1}{2NT})t}\right)$$

where, L is a natural number determined based on a bandwidth of the wireless communication system and a cycle period of the transmission signal, $\alpha_{n,s,l}$ is a complex-valued weighting factor determining a power and a phase of the subcarrier, N is a number of subcarrier groups, T is a cycle period, $\tilde{g}(t)$ is a function of which Fourier transform function $\tilde{G}(f)$ is defined by a following equation, $$\tilde{G}(f) \triangleq \mathscr{F}\{\tilde{g}(t)\} = \begin{cases} 1, & \forall f \in \left[0, \frac{1}{2NT}\right) \\ 0, & \text{elsewhere,} \end{cases}$$

and $f_l$ is a parameter defined by a following equation, $$f_l \triangleq \frac{l - \lfloor L/2 \rfloor - 1}{T}$$

where, $\lfloor \ \rfloor$ is a floor function, or $$s_{n,s}(t) = \sum_{l=1}^{L} \sum_{k=1}^{2NL} \left[ \frac{\alpha_{n,s,l}}{\sqrt{2NL}} e^{j2\pi(2(l-1)N+n)k/(2NL)} + \frac{\alpha_{n,s,l+L}}{\sqrt{2NL}} e^{j2\pi(2lN-n+1)k/(2NL)} \right] p(t - kT_c)$$

where, L is a natural number determined based on a bandwidth of the wireless communication system and a cycle period of the transmission signal, $\alpha_{n,s,l}$ is a complex-valued weighting factor determining a power and a phase of the subcarrier, N is a number of subcarrier groups, T is a cycle period, p(t) is a sinc pulse of which duration $T_c$ is T/(2NL).

2. The method of claim 1, wherein a frequency characteristic of the transmit filter is symmetry to a center frequency.

3. The method of claim 1, wherein the subcarrier group is determined based on the subcarrier by a following rule
    $1^{st}$ subcarrier group={1,2N, 2N+1,4N,4N+1, . . . , 2N(L−1)+1,2NL}$^{th}$ subcarrier;
    $2^{nd}$ subcarrier group={2,2N−1,2N+2,4N−1,4N+2, . . . , 2N(L−1)+2,2NL−1}$^{th}$ subcarrier; and
    $n^{th}$ subcarrier group={n,2N−(n−1),2N+n,4N−(n−1), . . . , 2N(L−1)+n,2NL−(n−1)}$^{th}$ subcarrier.

4. A wireless device in a wireless communication system, the wireless device comprising:
    a radio frequency (RF) unit for receiving a radio signal; and
    a processor, operatively coupled with the radio frequency unit, configured to:
    determine a subcarrier and a subcarrier group to which a data sequence is allocated;
    modulate the data sequence by a transmit filter to generate a data stream, a waveform of the transmit filter determined based on the subcarrier and the subcarrier group;
    generate a transmission signal based on the data stream; and
    transmit the transmission signal through the subcarrier, wherein the transmission signal is cyclostationary,
wherein the data sequence is a sth data sequence allocated to a nth subcarrier group, and the waveform of the transmit filter $s_{n,s}(t)$ is determined by one of following equations, $$s_{n,s}(t) = \sum_{l=1}^{L} \tilde{g}(t)\left(\alpha_{n,s,l} e^{j2\pi(f_l + \frac{n-1}{2NT})t} + \alpha_{n,s,l+L} e^{-j2\pi(f_l + \frac{n-1}{2NT})t}\right)$$

where, L is a natural number determined based on a bandwidth to the wireless communication system and a cycle period of the transmission signal, $\alpha_{n,s,l}$, is a complex-valued weighting factor determining a power and a phase of the subcarrier, N is a number of subcarrier groups, T is a cycle period, $\tilde{g}(t)$ is function of which Fourier transform function $\tilde{G}(f)$ is defined by a following equation, $$\tilde{G}(f) \triangleq \mathscr{F}\{\tilde{g}(t)\} = \begin{cases} 1, & \forall f \in \left[0, \frac{1}{2NT}\right) \\ 0, & \text{elsewhere,} \end{cases}$$

and $f_l$ is parameter defined by a following equation, $$f_l \triangleq \frac{l - \lfloor L/2 \rfloor - 1}{T}$$

where, $\lfloor \ \rfloor$ is a floor function, or $$s_{n,s}(t) = \sum_{l=1}^{L} \sum_{k=1}^{2NL} \left[\frac{\alpha_{n,s,l}}{\sqrt{2NL}} e^{j2\pi(2(l-1)N+n)k/(2NL)} + \frac{\alpha_{n,s,l+L}}{\sqrt{2NL}} e^{j2\pi(2lN-n+1)k/(2NL)}\right] p(t - kT_c)$$

where, L is a natural number determined based on a bandwidth of the wireless communication system and a cycle period of the transmission signal, $\alpha_{n,s,l}$ is a complex-valued weighting factor determining a power and a phase of the subcarrier, N is a number of subcarrier groups, T is a cycle period, p(t) is a since pulse of which duration $T_c$ is $T/(2NL)$.

5. The wireless device of claim 4, wherein a frequency characteristic of the transmit filter is symmetry to a center frequency.

6. The wireless device of claim 4, wherein the subcarrier group is determined based on the subcarrier by a following rule $1^{st}$ subcarrier group={1,2N, 2N+1,4N,4N+1, . . . , 2N(L−1)+1,2NL}$^{th}$ subcarrier;

$2^{nd}$ subcarrier group={2,2N−1,2N+2,4N−1,4N+2, . . . , 2N(L−1)+2,2NL−1}$^{th}$ subcarrier; and $n^{th}$ subcarrier group={n,2N−(n−1),2N+n,4N−(n−1), . . . , 2N(L−1)+n,2NL−(n−1)}$^{th}$ subcarrier.

* * * * *